US008446838B2

(12) United States Patent
Nagasaki

(10) Patent No.: US 8,446,838 B2
(45) Date of Patent: May 21, 2013

(54) WIRELESS COMMUNICATION DEVICE AND COMPUTER PROGRAM

(75) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 278 days.

(21) Appl. No.: 12/859,596

(22) Filed: Aug. 19, 2010

(65) Prior Publication Data

US 2011/0058500 A1   Mar. 10, 2011

(30) Foreign Application Priority Data

Sep. 7, 2009   (JP) .................................. 2009-206351

(51) Int. Cl.
*H04L 1/00* (2006.01)

(52) U.S. Cl.
USPC ........ 370/252; 370/395.2; 709/228; 709/229; 711/102; 711/104; 711/111

(58) Field of Classification Search
USPC ....... 370/395.2, 411, 461, 462, 463; 709/220, 709/221, 222, 223, 224, 225, 226, 227, 228, 709/229; 711/101, 102, 103, 104, 105, 118, 711/119, 120, 121, 122, 123, 125, 126
See application file for complete search history.

(56) References Cited

U.S. PATENT DOCUMENTS

| 7,764,981 | B2 * | 7/2010 | Kalofonos et al. ............. 455/574 |
| 2006/0218241 | A1 * | 9/2006 | Fok et al. ........................ 709/217 |
| 2008/0082543 | A1 * | 4/2008 | Abhishek et al. ............... 707/10 |

FOREIGN PATENT DOCUMENTS

| JP | 2004-7120 | 1/2004 |
| JP | 2008-167149 | 7/2008 |

* cited by examiner

*Primary Examiner* — Alvin Zhu
(74) *Attorney, Agent, or Firm* — Scully, Scott, Murphy & Presser, PC

(57) ABSTRACT

A wireless communication device is provided. The device is connectable to a first wireless network including an access point and a second wireless network including a terminal having an access point function. The device includes a setting section which stores setup data in a volatile storage area, a communication section which performs wireless communication using the setup data stored in the volatile storage area, and a determination section which determines which wireless networks the device is to be connected to. If the device is to be connected to the first wireless network, the setting section stores first setup data from the access point into the volatile storage area and a non-volatile storage area. If the device is to be connected to the second wireless network, the setting section stores second setup data from the terminal into the volatile storage area without storing it into the non-volatile storage area.

9 Claims, 6 Drawing Sheets

US 8,446,838 B2

WIRELESS COMMUNICATION DEVICE AND COMPUTER PROGRAM

CROSS REFERENCE TO RELATED APPLICATION

This application claims priority from Japanese Patent Application No. 2009-206351, filed on Sep. 7, 2009, the entire subject matter of which is incorporated herein by reference.

TECHNICAL FIELD

Aspects of the present invention relate to a wireless communication device which is connected to a wireless network using wireless setup data.

BACKGROUND

In order to establish connection to a wireless network, a wireless communication device is necessary to store wireless setup data regarding an encryption method, an authentication method, or the like to be used in the wireless network. For example, Japanese Patent Application Publication 2004-7120 describes a wireless communication device connectable to a plurality of wireless networks using different wireless setup data (profiles). The wireless communication device stores wireless setup data corresponding to each of the plurality of wireless networks in a storage section. When the connection to one wireless network is disconnected, the wireless communication device is connected to a wireless network different from the disconnected wireless network using different wireless setup data stored in the storage section.

SUMMARY

Since the memory storage capacity within the wireless communication device is not infinite, a technique for appropriately managing memory resources is necessary. This specification discloses a technique for appropriately storing wireless setup data.

According to an aspect of this disclosure, there is provided a wireless communication device. The wireless communication device is connectable to a first wireless network including an access point and which is connectable to a second wireless network including a terminal device having an access point function. The wireless communication device includes a setting section, a communication section and a determination section. The setting section is configured to store wireless setup data in a volatile storage area, which is acquired according to an automatic wireless setup mode. The communication section is configured to perform wireless communication using the wireless setup data stored in the volatile storage area. The determination section is configured to determine which one of the first wireless network and the second wireless network the wireless communication device is to be connected to, based on information which can be included in a specific signal received from the access point or the terminal device. If the determination section determines that the wireless communication device is to be connected to the first wireless network, the setting section stores first wireless setup data acquired from the access point into the volatile storage area and a non-volatile storage area. If the determination section determines that the wireless communication device is to be connected to the second wireless network, the setting section stores second wireless setup data acquired from the terminal device into the volatile storage area without storing the second wireless setup data into the non-volatile storage area.

A control method and a computer program for implementing the above wireless communication device are also new and useful. A system including the wireless communication device, the first wireless network, and the second wireless network is also new and useful.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Illustrative Embodiment (Configuration of Multi-Function Device 10)

Figure 1:
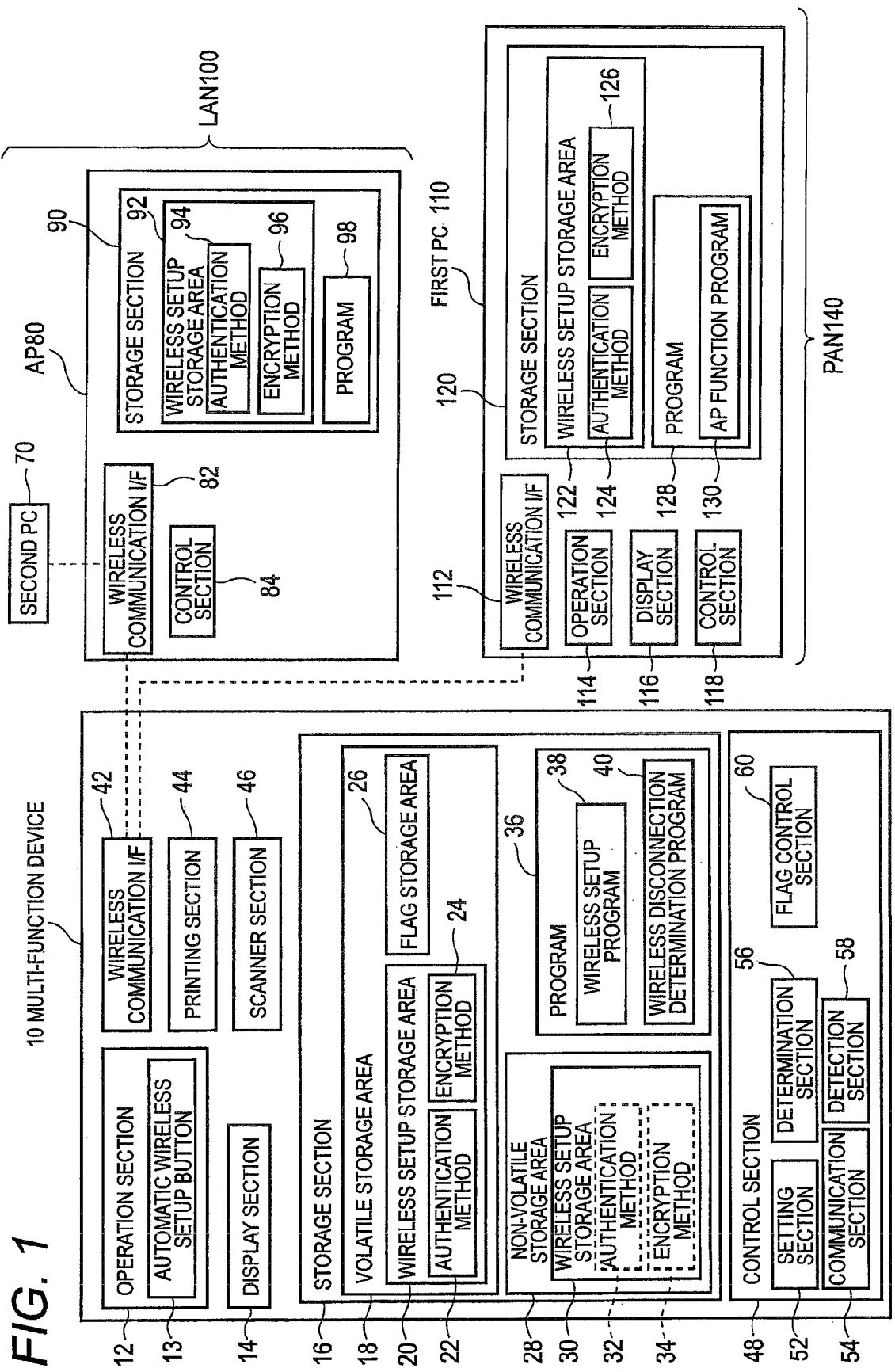
FIG. 1 shows an example of the configuration of a multi-function device.

The configuration of the multi-function device 10 will be described in detail with reference to FIG. 1. FIG. 1 shows the configuration of the multi-function device 10, a Local Area Network (LAN) 100, and a Personal Area Network (PAN) 140. The multi-function device 10 is connectable to the LAN 100 including an access point (referred to as AP in the figures and hereinafter) 80, and also is connectable to the PAN 140 including a first PC 110 having an AP function.

The multi-function device 10 includes an operation section 12, a display section 14, a storage section 16, a wireless communication interface (I/F) 42, a printing section 44, a scanner section 46, a control section 48, and the like. The operation section 12 includes a plurality of buttons to be operated by a user. It is noted that an automatic wireless setup button 13 is included in the operation section 12 as shown in FIG. 1. The automatic wireless setup button 13 is a button for setting wireless setup data (an authentication method 22 and an encryption method 24 to be described later) in the multi-function device 10 in an automatic wireless setup mode. A manual wireless setup mode is also provided as a concept as opposed to the automatic wireless setup mode. When the manual wireless setup mode is used, the user is necessary to input wireless setup data to be set in the multi-function device 10 by operating the operation section 12. For example, the user is necessary to select one type of authentication method from among a plurality of types of authentication methods and further select one type of encryption method from among a plurality of types of encryption methods. In contrast, when the automatic wireless setup mode is used, wireless setup data can be set in the multi-function device 10 as the user performs a simple operation (described later).

The display section 14 displays various kinds of information. The scanner section 46 generates scan data by reading a document or the like set in the scanner section 46. The printing section 44 prints the print data from an outside source, or the scan data generated by the scanner section 46 provided in the multi-function device 10, on a print medium. The wireless communication I/F 42 is an interface for wirelessly communicating with external devices (for example, the AP 80 and the first PC 110). In FIG. 1, the dotted line between the wireless communication I/F 42 and a wireless communication OF 82 of the AP 80 indicates that wireless communication is possible between the multi-function device 10 and the AP 80 when the multi-function device 10 is wirelessly connected to the LAN 100. In FIG. 1, the dotted line between the wireless communication I/F 42 and a wireless communication I/F 112 of the first PC 110 indicates that wireless communication is possible between the multi-function device 10 and the first PC 110 when the multi-function device 10 is wirelessly connected to the PAN 140.

The storage section 16 includes a volatile storage area 18, a non-volatile storage area 28, and the like. For example, the volatile storage area 18 is configured by a Dynamic Random Access Memory (DRAM). Data stored in the volatile storage area 18 is deleted when the multi-function device 10 is powered off. The volatile storage area 18 includes a wireless setup storage area 20, a flag storage area 26, and the like. The wireless setup storage area 20 is a storage area for storing wireless setup data (the authentication method 22 and the encryption method 24) to be used when the multi-function device 10 is connected to the wireless networks such as the LAN 100 and the PAN 140 to perform wireless communication. The flag storage area 26 stores the ON or OFF of the connection flag. The flag of the flag storage area 26 is changed by the flag control section 60 of the control section 48 (described later).

The non-volatile storage area 28 is configured, for example, by a Non-Volatile Random Access Memory (NVRAM). Data stored in the non-volatile storage area 28 is not deleted even when the multi-function device 10 is powered off. The non-volatile storage area 28 includes a wireless setup storage area 30 and the like. The wireless setup storage area 30 is a storage for storing wireless setup data (an authentication method 32 and an encryption method 34) to be used for the connection of the multi-function device 10 to the LAN 100 among wireless setup data stored in the wireless setup storage area 20 of the storage area 18. That is, the wireless setup storage area 30 does not store wireless setup data to be used for the connection of the multi-function device 10 to the PAN 140.

The storage section 16 further stores a program 36. The program 36 includes a basic function program for executing a basic function of the multi-function device 10 such as a print process or a display process, a wireless setup program 38 for executing a process of the multi-function device 10 (described later), a wireless disconnection determination program 40, and the like.

The control section 48 is configured by a Central Processing Unit (CPU) (not shown). The control section 48 executes various processes according to the program 36 stored in the storage section 16. As the control section 48 executes a process according to the program 36, the functions of a setting section 52, a communication section 54, a determination section 56, a detection section 58, and the flag control section 60 are implemented.

(Configuration of LAN 100)

The configuration of the LAN 100 will be described in detail with reference to FIG. 1. The LAN 100 is a wireless network provided by the AP function of the AP 80. The LAN 100 includes the AP 80, a second PC 70, and the like. The AP 80 and the second PC 70 are wirelessly connected to be wirelessly communicable. The AP 80 includes a wireless communication I/F 82, a control section 84, a storage section 90, and the like. The wireless communication I/F 82 is an interface for wirelessly communicating with external devices (for example, the multi-function device 10 and the second PC 70). In FIG. 1, the dotted line between the wireless communication I/F 82 and the second PC 70 indicates that the AP 80 is wirelessly communicable with the second PC 70.

The control section 84 is configured by a CPU (not shown). The control section 84 executes various processes according to a program 98 (for example, an AP function program or the like) stored in the storage section 90. The storage section 90 includes a wireless setup storage area 92. The wireless setup storage area 92 is a storage area for storing wireless setup data (an authentication method 94 and an encryption method 96) to be used when the AP 80 wirelessly communicates with a device included in the LAN 100 (for example, the multi-function device 10 after the connection to the second PC 70 and the LAN 100). The storage section 90 further stores the program 98. The program 98 includes the AP function program for enabling the AP 80 to provide the AP function.

(Configuration of PAN 140)

The configuration of the PAN 140 will be described in detail with reference to FIG. 1. The PAN 140 is a wireless personal area network configured by the AP function that the first PC 110 provides. The PAN 140 includes the first PC 110. The first PC 110 is a portable PC. The first PC 110 includes the wireless communication I/F 112, an operation section 114, a display section 116, a control section 118, a storage section 120, and the like. The wireless communication I/F 112 is an interface for wirelessly communicating with an external device (for example, the multi-function device 10). The operation section 114 is configured by a mouse and a keyboard. The display section 116 displays various kinds of information.

The control section 118 is configured by a CPU (not shown). The control section 118 executes various processes according to a program 128 (for example, an AP function program 130 or the like) stored in the storage section 120. The storage section 120 includes a wireless setup storage area 122. The wireless setup storage area 122 is a storage area for storing wireless setup data (an authentication method 124 and an encryption method 126) to be used when the first PC 110 wirelessly communicates with a device included in the PAN 140 (for example, the multi-function device 10 after the connection to the PAN 140). The storage section 120 further stores a program 128. The program 128 includes the AP function program 130 for enabling the first PC 110 to provide the AP function.

The AP function program 130 has the function of My WiFi Technology proposed by Intel Corporation (registered trademark). The PAN 140 is different from Bluetooth (registered trademark). The PAN 140 is used for wireless communication to be performed according to IEEE 802.11, while Bluetooth is used for wireless communication to be performed according to IEEE 802.15. When the first PC 110 provides the AP function, a plurality of devices included in the PAN 140 can perform communication via the first PC 110 (the AP of the first PC 110). On the other hand, a plurality of devices cannot perform communication via another device in Bluetooth.

(Process to be Executed by Each Device)

The outline of a process to be executed by each of the devices 10, 80, and 110 will be described with reference to FIG. 2. When the user operates the automatic wireless setup button 13 of the multi-function device 10, the multi-function device 10 receives beacon signals transmitted from external devices (the AP 80 and the first PC 110). First, the case where the multi-function device 10 receives the beacon signal transmitted from the AP 80 will be described, and subsequently the case where the multi-function device 10 receives the beacon signal from the first PC 110 will be described.

When the user desires to connect the multi-function device 10 to the LAN 100, the user operates a predetermined button (not shown) of the AP 80 in addition to operating the automatic wireless setup button 13 of the multi-function device 10. When the predetermined button is operated, the AP 80 transmits a beacon signal toward a predetermined range around the AP 80. As a result, the multi-function device 10 receives the beacon signal from the AP 80. When the beacon signal is received from the AP 80, the multi-function device 10 performs communication 152 for wireless setup with the AP 80. In the communication 152 for automatic wireless setup, Wi-Fi Protected Setup (WPS), one of automatic wireless setup modes, is used. In the first illustrative embodiment, a WPS push button system is used. The communication 152 for automatic wireless setup includes a process in which the AP 80 receives a probe request transmitted from the multi-function device 10, a process in which the multi-function device 10 receives a probe response transmitted from the AP 80, and the like. The multi-function device 10 analyzes the probe response. Specifically, the multi-function device 10 checks whether specific information indicating that a transmission source of the probe response supports My WiFi Technology is included in the probe response. Herein, the transmission source of the probe response is the AP 80, and the AP 80 does not support My WiFi Technology. Accordingly, it is checked that the specific information is not included in the probe response. Since the specific information is not included in the probe response, the multi-function device 10 determines that the wireless network to be connected is the LAN 100.

The AP 80 transmits a first wireless setup data 154 to the multi-function device 10. The first wireless setup data 154 includes the authentication method 94 and the encryption method 96 prestored in the storage section 90 of the AP 80. The multi-function device 10 stores the first wireless setup data 154 in both the wireless setup storage area 20 of the volatile storage area 18 and the wireless setup storage area 30 of the non-volatile storage area 28 (S12). Accordingly, the multi-function device 10 becomes connectable to the LAN 100 using the first wireless setup data 154 stored in the wireless setup storage area 20 of the volatile storage area 18. Since the multi-function device 10 is connected to the LAN 100, the first wireless setup data 154 is first read from the wireless setup storage area 20. Next, the multi-function device 10 transmits a first signal to the AP 80 using the first wireless setup data 154. For example, the multi-function device 10 transmits the first signal including information encrypted by the encryption method included in the first wireless setup data 154. In response to the first signal, the AP 80 transmits a second signal. The multi-function device 10 is connected to the LAN 100 by communication of at least the first and second signals between the multi-function device 10 and the AP 80. In a state where the multi-function device 10 has been connected to the LAN 100, the multi-function device 10 can wirelessly communicate various data with a device (for example, the second PC 70) included in the LAN 100 (see wireless communication 156). For example, the second PC 70 can provide the multi-function device 10 with data to be printed by the multi-function device 10 using the wireless communication 156 via the AP 80. Also, for example, the multi-function device 10 can transmit scan data generated by itself to the second PC 70 using the wireless communication 156 via the AP 80. In the wireless communication 156, data is encrypted according to the first wireless setup data 154.

The multi-function device 10 detects that the wireless connection to the AP 80 has been disconnected (S14). The multi-function device 10 performs communication 158 (communication of the first and second signals) for attempting to establish the reconnection to the LAN 100 using the first wireless setup data 154 stored in the wireless setup storage area 20 of the volatile storage area 18. Thereby, the multi-function device 10 is reconnected to the LAN 100 (wireless communication 160).

Next, the case where the multi-function device 10 receives a beacon signal transmitted from the first PC 110 will be described. When the user desires to connect the multi-function device 10 to the PAN 140, the user operates a predetermined operation in the operation section 114 of the first PC 110 in addition to operating the automatic wireless setup button 13 of the multi-function device 10. When the predetermined operation is performed, the first PC 110 transmits a beacon signal toward a predetermined range around the first PC 110. As a result, the multi-function device 10 receives the beacon signal from the first PC 110. Upon receipt of the beacon signal transmitted from the first PC 110, the multi-function device 10 performs communication 162 for automatic wireless setup with the first PC 110. In the communication 162 for wireless setup, WPS, one of automatic wireless setup mode, is used. The communication 162 for automatic wireless setup includes a process in which the first PC 110 receives a probe request transmitted from the multi-function device 10, a process in which the multi-function device 10 receives a probe response transmitted from the first PC 110, and the like. Similarly to the above, the multi-function device 10 analyzes the probe response. Herein, the transmission source of the probe response is the first PC 110, and the first PC 110 supports My WiFi Technology. Accordingly, the specific information indicating that the transmission source of the probe response supports My WiFi Technology is included in the probe response. Therefore, the multi-function device 10 determines that the wireless network to be connected is the PAN 140.

The first PC 110 transmits the second wireless setup data 164 to the multi-function device 10. The second wireless setup data 164 includes the authentication method 130 and the encryption method 132 prestored in the storage section 120 of the first PC 110. The multi-function device 10 stores the second wireless setup data 164 in the wireless setup storage area 20 of the volatile storage area 18 (S16). Differently from the above-described process of S12, the multi-function device 10 does not store the second wireless setup data 164 in the wireless setup storage area 30 of the non-volatile storage area 28. If the first wireless setup data 154 has been stored in the wireless setup storage area 20 of the volatile storage area 18 when S16 is executed, the multi-function device 10 deletes the first wireless setup data 154 from the wireless setup storage area 20, and stores the second wireless setup data 164 in the wireless setup storage area 20. That is, the multi-function device 10 overwrites the second wireless setup data 164 in the wireless setup storage area 20. In a state where the second wireless setup data 164 is stored in the wireless setup storage area 20, the multi-function device 10 is connectable to the PAN 140 using the second wireless setup data 164 of the wireless setup storage area 20. The multi-function device 10 is connected to the PAN 140 by executing the similar process as when the multi-function device 10 is connected to the LAN 100. That is, the multi-function device 10 reads the second wireless setup data 164 from the wireless setup storage area 20 and performs communication of the above-described first and second signals with the first PC 110 using the second wireless setup data 164. In a state where the multi-function device 10 has been connected to the PAN 140, the multi-function device 10 can wirelessly communicate various data (print data, scan data, and the like) with a device (for example, the first PC 110) included in the PAN 140 (see wireless communication 166). In the wireless communication 166, data is encrypted according to the second wireless setup data 164.

The multi-function device 10 detects that the wireless connection to the first PC 110 has been disconnected (S18). The multi-function device 10 performs communication 168 (communication of the first and second signals) for attempting to establish the reconnection to the PAN 140 with the first PC 110 using the second wireless setup data 164 stored in the wireless setup storage area 20 of the volatile storage area 18. The multi-function device 10 repeatedly transmits the above-described first signal to the first PC 110 a preset number of times or over a preset time. When the second signal as a response to the first signal is not received, the multi-function device 10 determines that the reconnection to the PAN 140 is not possible. In this case, the multi-function device 10 performs communication 170 (communication of the first and second signals) for attempting to establish the connection to the LAN 100 with the AP 80 using the first wireless setup data 154 stored in the wireless setup storage area 30 of the non-volatile storage area 28 in the process of S12. Accordingly, the multi-function device 10 is connected to the LAN 100 (wireless communication 172).

(Wireless Connection Process by Multi-Function Device)

A wireless connection process to be executed by the multi-function device 10 in the above-described process will be described in detail. When the multi-function device 10 receives a beacon signal from the AP 80 or the first PC 110, the wireless connection process is started. As shown in FIG. 3, the communication section 54 of the multi-function device 10 transmits a probe request to a transmission source of the beacon signal (S32) (communications 152 and 162 for wireless setup in FIG. 2). The communication section 54 monitors the reception of a probe response from a transmission destination of the probe request (S34). If a probe response is received (YES in S34), the determination section 56 analyzes the received probe response (S36). The determination section 56 determines whether the specific information indicating that the transmission source of the probe response supports My WiFi Technology is included in the probe response (S38). If it is determined that the specific information is included in the probe response (YES in S38), that is, when the network to be connected to the multi-function device 10 is the PAN 140, the flag control section 60 turns on a connection flag stored in the flag storage area 26 (S40). On the other hand, if it is determined that the specific information is not included in the probe response (NO in S38), that is, when the network to be connected to the multi-function device 10 is the LAN 100, the flag control section 60 turns off the connection flag stored in the flag storage area 26 (S42).

Figure 2:
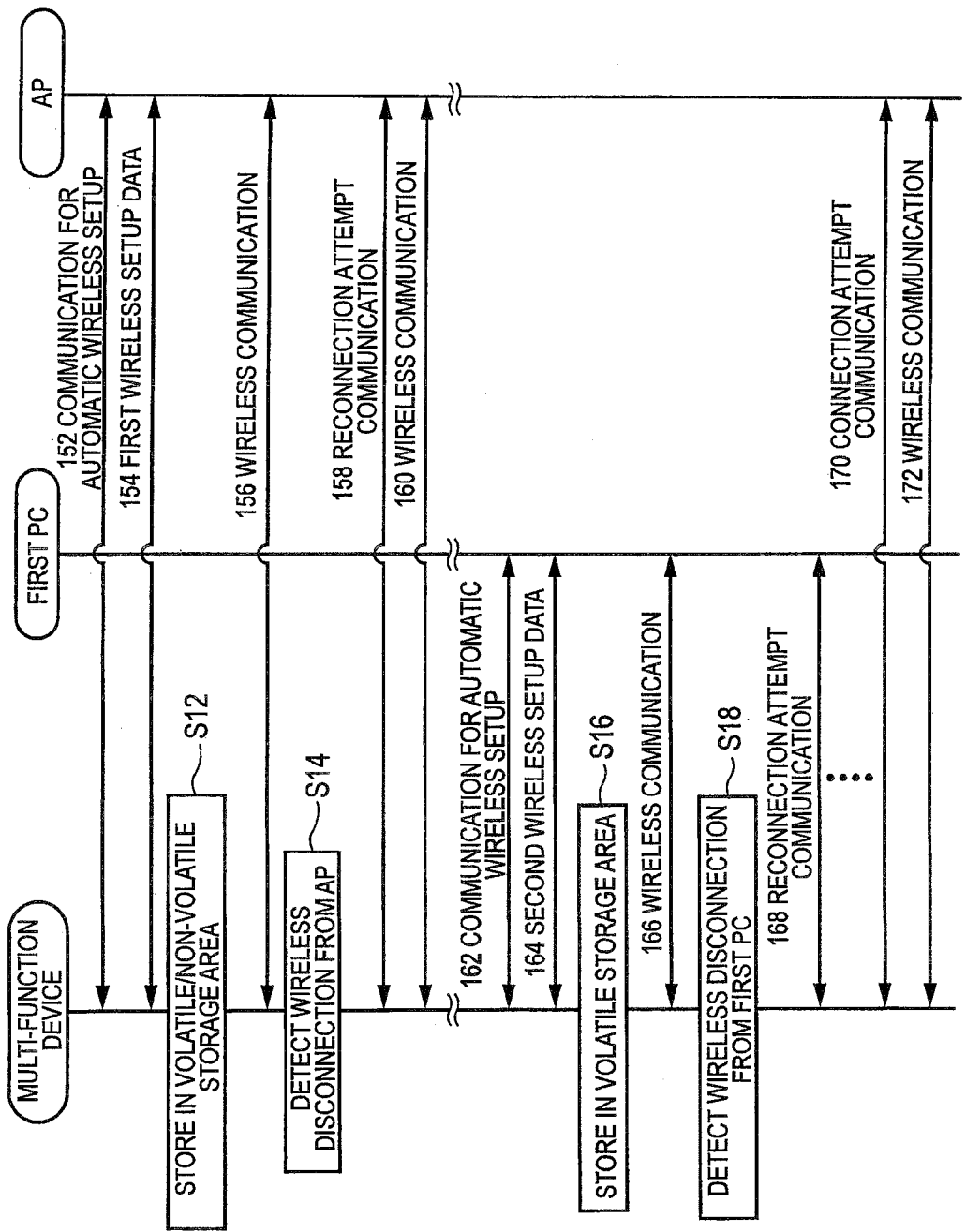
FIG. 2 shows a sequence diagram of a process to be executed by each device.
Figure 3:
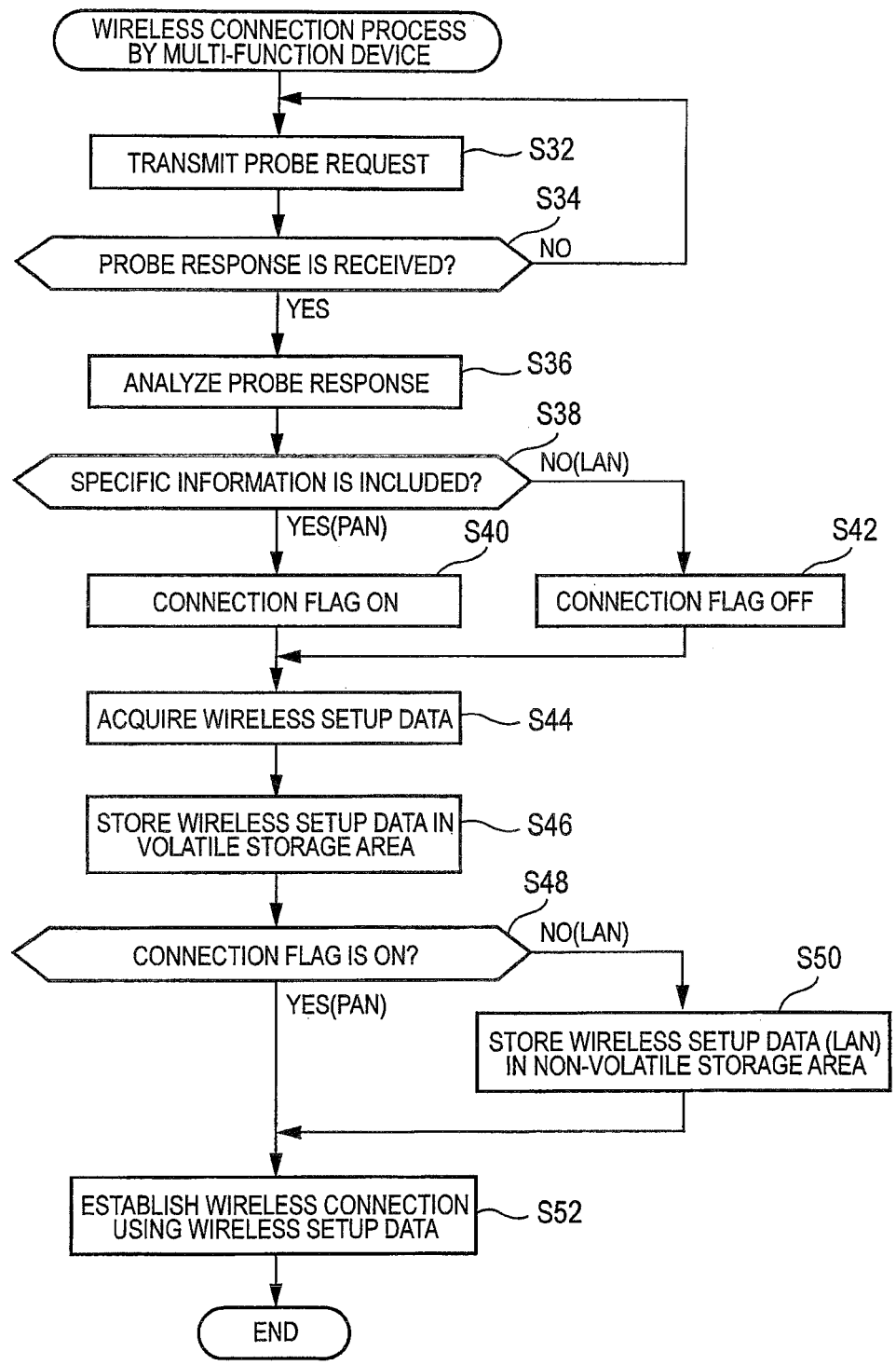
FIG. 3 shows a flowchart of a wireless connection process to be executed by the multi-function device.

Next, the setting section 52 acquires wireless setup data (an authentication method, an encryption method, and the like) from the AP 80 or the first PC 110 (S44) (the first wireless setup data 154 or the second wireless setup data 164 of FIG. 2). The setting section 52 stores the acquired wireless setup data in the volatile storage area 18 (S46) (S12 and S16 in FIG. 2). Subsequently, the setting section 52 determines whether the connection flag is ON (S48). If it is determined that the connection flag is ON (YES in S48), that is, when the network to be connected to the multi-function device 10 is the PAN 140, the process proceeds to S52. On the other hand, if it is determined that the connection flag is OFF (NO in S48), that is, when the network to be connected to the multi-function device 10 is the LAN 100, the first wireless setup data 154 is stored in the non-volatile storage area 28 (S50) (S12 in FIG. 2), the process proceeds to S52. In S52, the communication section 54 transmits the first signal to the LAN 100 or the PAN 140 using the wireless setup data acquired in S44, or in other words, using the wireless setup data stored in the wireless setup storage area 20 within the volatile storage area 18 in S46. As the communication section 54 receives the second signal from the AP 80 or the first PC 110 in response to the first signal, the multi-function device 10 is connected to the LAN 100 or the PAN 140. Thereby, the multi-function device 10 is wirelessly communicable with a device included in the LAN 100 or the PAN 140 (the wireless communication 156 or 166 in FIG. 2).

(Reconnection Process by Multi-Function Device)

Subsequently, the reconnection process to be executed by the multi-function device 10 will be described. When the multi-function device 10 is connected to the LAN 100 or the PAN 140, the communication section 54 of the multi-function device 10 executes a process of periodically determining whether the connection to the LAN 100 or the PAN 140 is established. First, the communication section 54 of the multi-function device 10 resets a timer (not shown) of the control section 48 (S62). The communication section 54 determines whether the connection to the LAN 100 or the PAN 140 has been disconnected (S64). For example, when the multi-function device 10 is connected to the LAN 100, the communication section 54 periodically transmits a search signal, which searches for the AP 80, to the AP 80. The CPU of the AP 80 transmits a response signal to the multi-function device 10 in response to the search signal. Upon receipt of the response signal from the AP 80, the communication section 54 of the multi-function device 10 returns to S62 while determining that the connection to the LAN 100 is established (NO in S66).

When the response signal is not received even though the search signal is transmitted a predetermined number of times, the communication section 54 determines that the connection has been disconnected (YES in S66). The communication section 54 attempts to establish the reconnection to the disconnected wireless network using wireless setup data (the authentication method 22 and the encryption method 24) stored in the wireless setup storage area 20 of the volatile storage area 18 (S68) (the reconnection attempts 158 and 168 of FIG. 2). That is, the communication section 54 transmits the first signal using the wireless setup data stored in the wireless setup storage area 20. The communication section 54 determines whether the reconnection to the wireless network from which the disconnection has been detected is established by the attempt of S68 (S70). Upon receipt of the second signal as a response to the first signal, the communication section 54 determines that the reconnection to the wireless network from which the disconnection has been detected is established. If it is determined that the reconnection is established (YES in S70), the process returns to S62. On the other hand, if it is determined that reconnection is not established (NO in S70), the communication section 54 determines whether the timer has exceeded a predetermined time (S72). If it is determined that the timer has not exceeded the predetermined time (NO in S72), the process returns to S64. In this configuration, the communication section 54 attempts to establish the reconnection to the wireless network during a predetermined period by maintaining wireless setup data stored in the wireless setup storage area 20 of the volatile storage area 18 when the disconnection is detected. That is, the communication section 54 continues the process of transmitting the first signal to the wireless network during the predetermined period.

On the other hand, if it is determined that the timer has exceeded the predetermined time (YES in S72), that is, when the connection to the wireless network is not possible even though the reconnection is attempted during the predetermined period, the communication section 54 determines whether the connection flag stored in the flag storage area 26 is ON (S74). If it is determined that the connection flag is not stored (NO in S74), that is, when the disconnected network is the LAN 100, the process proceeds to S80. On the other hand, if it is determined that the connection flag is stored (YES in S74), that is, when the disconnected network is the PAN 140, the communication section 54 reads the first wireless setup data 154 stored in the wireless setup storage area 30 of the non-volatile storage area 28 (S76). Next, the communication section 54 overwrites the read first wireless setup data 154 on the second wireless setup data 164 stored in the wireless setup storage area 20 and stores the first wireless setup data 154 (S78). The communication section 54 ends the process by attempting to establish the connection to the LAN 100 using the first wireless setup data 154 stored in the wireless setup storage area 20 (S80), that is, by transmitting the first signal to the AP 80 using the first wireless setup data 154.

In the above, the multi-function device 10 according to the first illustrative embodiment has been described. According to the first illustrative embodiment, the multi-function device 10 stores the first wireless setup data 154 to be used for wireless communication with the LAN 100 in the wireless setup storage area 30 within the non-volatile storage area 28. On the other hand, the multi-function device 10 does not store the second wireless setup data 164 to be used for wireless communication with the PAN 140, in the wireless setup storage area 30 within the non-volatile storage area 28. As a result, wireless setup data to be stored in the non-volatile storage area 28 can be reduced.

In an environment where the multi-function device 10 is connected to the LAN 100, the AP 80 is generally fixed near the multi-function device 10, and the multi-function device 10 is continuously used within the same LAN 100. Accordingly, in the first illustrative embodiment, when the multi-function device 10 has been powered off and re-powered on, the first wireless setup data 154 is stored in the non-volatile storage area 28 so that the reconnection to the LAN 100 can be established even though the first wireless setup data 154 is not re-acquired from the AP 80. On the other hand, the user of a portable device like the first PC 110 of this illustrative embodiment may desire to temporarily use the multi-function device 10. In this case, the multi-function device 10 is temporarily connected to the PAN 140 so that the first PC 110 can temporarily use the multi-function device 10. In an environment where the multi-function device 10 is connected to the PAN 140, the multi-function device 10 temporarily uses the PAN 140 by using the AP function of the first PC 110. The second wireless setup data 164 for the PAN 140 (the portable device) to which the multi-function device 10 is temporarily connected is not necessary to be continuously stored in the multi-function device 10, and may be deleted when the multi-function device 10 is powered off. Accordingly, in the first illustrative embodiment, the second wireless setup data 164 is not stored in a non-volatile storage section. Thus, wireless setup data to be stored in the non-volatile storage section is reduced.

Generally, the case where the disconnection between the multi-function device 10 and the LAN 100 is detected is the case where the AP 80 is temporarily down or the case where a temporary communication error is occurring. Accordingly, when this kind of problem is solved, the multi-function device 10 can be reconnected to the LAN 100. In the first illustrative embodiment, when the disconnection from the LAN 100 is detected, the multi-function device 10 attempts to establish the reconnection to the LAN 100 using the first wireless setup data 154. Thereby, the multi-function device 10 can be reconnected to the LAN 100.

On the other hand, the case when the disconnection between the multi-function device 10 and the PAN 140 is detected includes the case where the reconnection to the PAN 140 is possible and the case where the reconnection to the PAN 140 is not possible. For example, the case where the reconnection to the PAN 140 is possible includes the case where the reconnection to the PAN 140 is possible when the problem is solved while the first PC 110 is temporarily down, the case where a communication error temporarily occurs, or the like. The case where the reconnection to the PAN 140 is not possible includes the case where the first PC 110 is not located by the multi-function device 10 as the user moves the first PC 110, the case where the first PC 110 is located far away from the multi-function device 10, and the case where the first PC 110 is powered off. In the first illustrative embodiment, when the disconnection from the PAN 140 is detected, the multi-function device 10 attempts to establish the reconnection to the PAN 140 using the second wireless setup data 164. Thereby, the multi-function device 10 can be reconnected to the PAN 140 when the reconnection between the multi-function device 10 and the PAN 140 is possible. When the reconnection to the PAN 140 is not possible, the multi-function device 10 attempts to establish the connection to the LAN 100 using the first wireless setup data 154. Thereby, the connection to the LAN 100 can be established when the connection to the PAN 140 has been disconnected.

When the first wireless setup data 154 is stored in the wireless setup storage area 20 of the volatile storage area 18 in place of the second wireless setup data 164, the multi-function device 10 overwrites the first wireless setup data 154 on the second wireless setup data 164 and stores the first wireless setup data 154. In this configuration, the second wireless setup data 164 corresponding to the disconnected PAN 140 is deleted from the multi-function device 10. The wireless setup data 164 for establishing the connection to the PAN 140 can be prevented from being stored in the multi-function device 10 which is not connected to the PAN 140.

Second Illustrative Embodiment

A difference from the first illustrative embodiment will be described. In the first illustrative embodiment, the communication section 54 of the multi-function device 10 executes the process of S74 in FIG. 4 and subsequent steps when the reconnection is not possible during a predetermined period by attempting to establish the reconnection to the disconnected network (the LAN 100 or the PAN 140) (S68 in FIG. 4). The second illustrative embodiment is different from the first illustrative embodiment in that the process of S74 and subsequent steps is executed when the reconnection is not possible even though a predetermined number of attempts are executed in attempting to establish the reconnection to the network from which the communication section 54 of the multi-function device 10 has been disconnected.

(Reconnection Process by Multi-Function Device)

Figure 4:
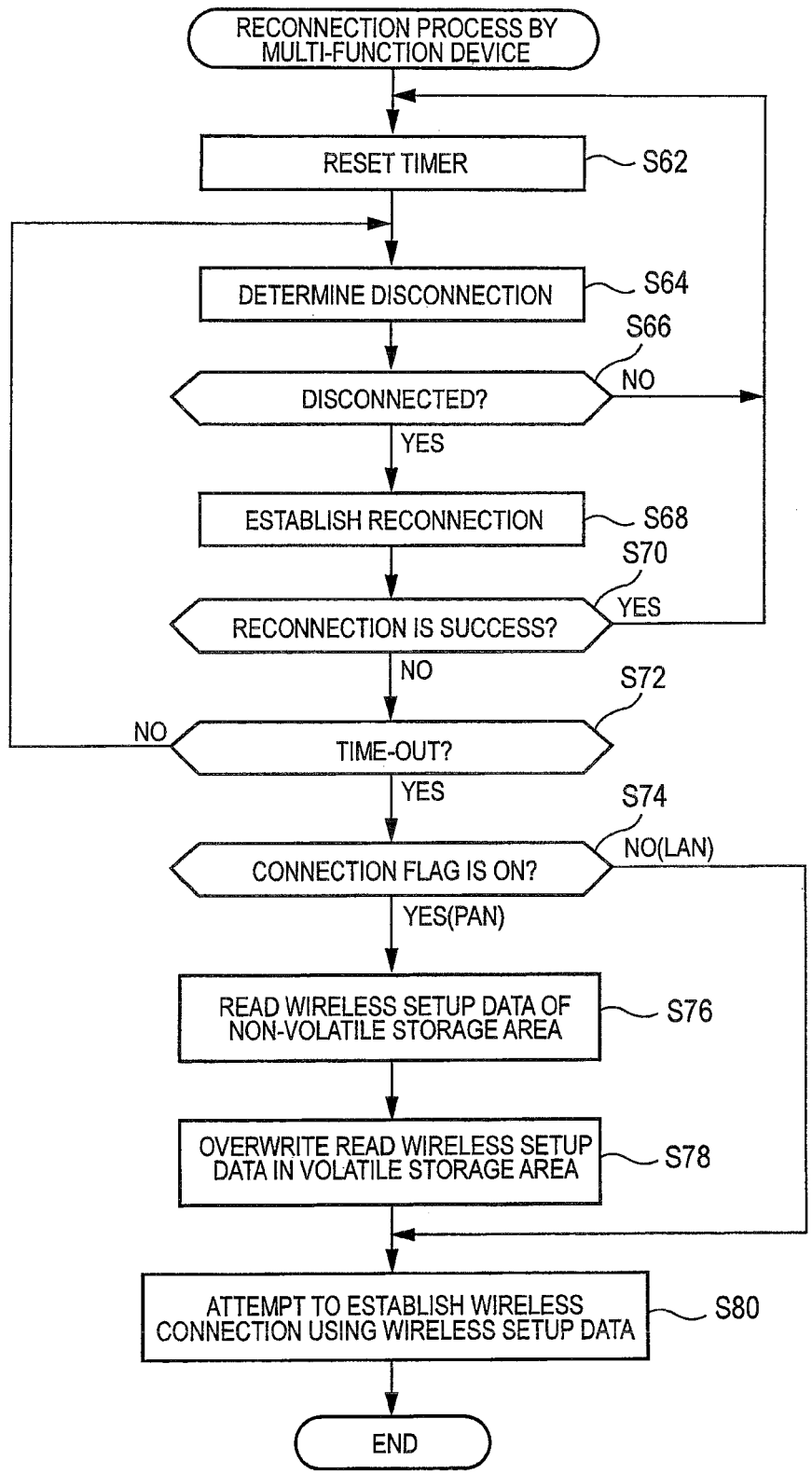
FIG. 4 shows a flowchart of a reconnection process to be executed by a multi-function device according to a first illustrative embodiment.
Figure 5:
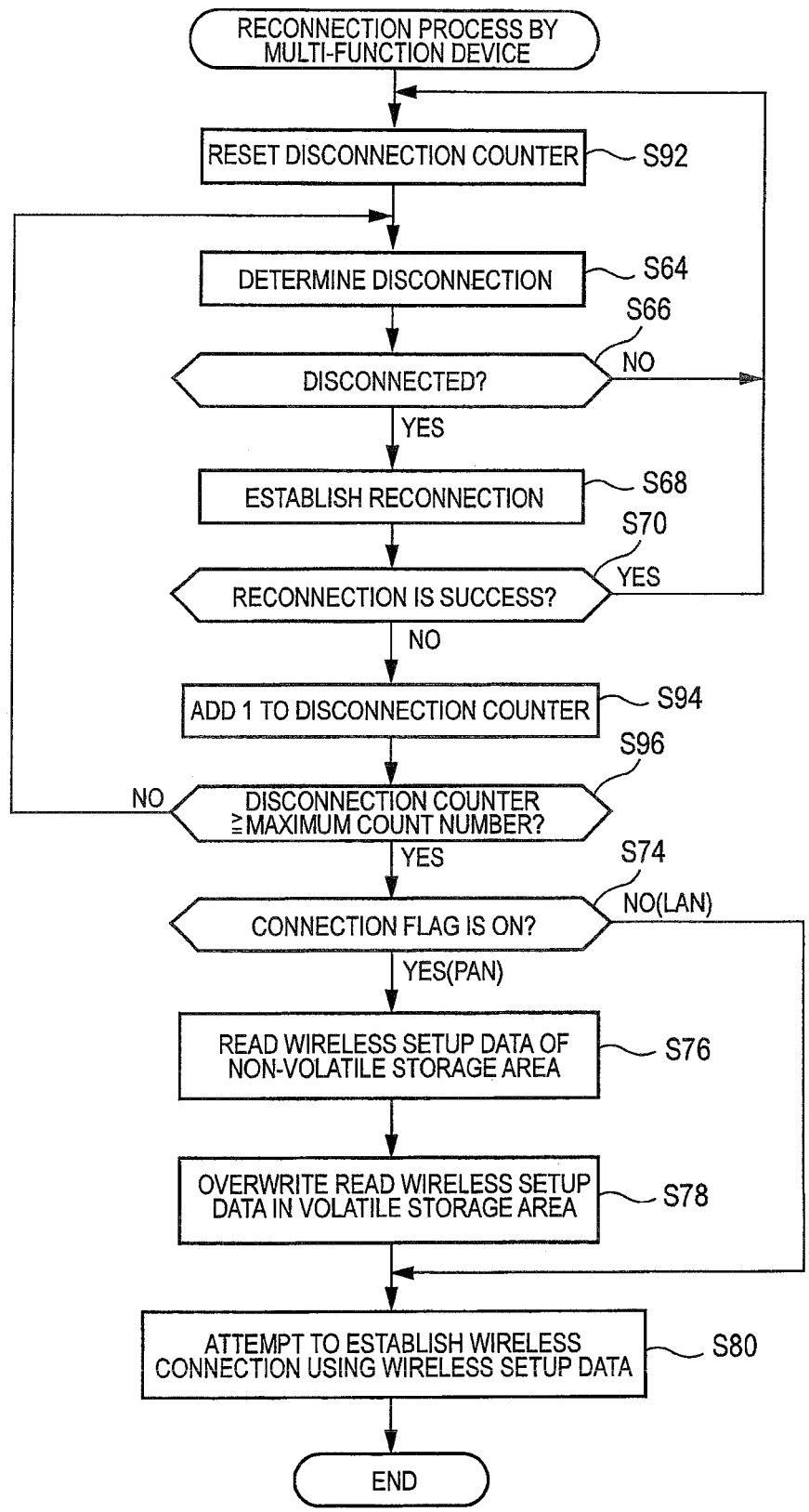
FIG. 5 shows a flowchart of a reconnection process to be executed by a multi-function device according to a second illustrative embodiment.

FIG. 5 is a flowchart showing the reconnection process of the multi-function device 10. The same process as that of the flowchart of FIG. 4 is denoted by the same reference numeral, and description thereof is omitted. The communication section 54 of the multi-function device 10 resets a value of a disconnection counter (not shown) stored in a predetermined storage area of the storage section 16 (S92). The communication section 54 executes the process of S64 to S70. If it is determined that the reconnection is not established (NO in S70), the communication section 54 adds "1" to the value of the disconnection counter (S94). Next, the communication section 54 determines whether the value of the disconnection counter is equal to or greater than a preset maximum count number (S96). If it is determined that the value is smaller than the preset maximum count number NO in S96), the process returns to S64. On the other hand, if it is determined that the value is equal to or greater than the present maximum count number (YES in S96), the communication section 54 executes the process of S74 to S80.

The multi-function device 10 according to the second illustrative embodiment can also have the same effect as the multi-function device 10 of the first illustrative embodiment.

Third Illustrative Embodiment

A difference from the first illustrative embodiment will be described. In the first illustrative embodiment, the communication section 54 of the multi-function device 10 attempts to establish the reconnection using wireless setup data of a detected disconnected network regardless of whether the disconnection detected by the detection section 58 is the disconnection from the LAN 100 or the disconnection from the PAN 140 (S68 of FIGS. 4 and 5). The third illustrative embodiment is different from the first illustrative embodiment in that a process to be executed by the communication section 54 is different based on which one of the LAN 100 and the PAN 140 the detected disconnected network is when the disconnection is detected by the detection section 58.

(Reconnection Process by Multi-Function Device)

Figure 6:
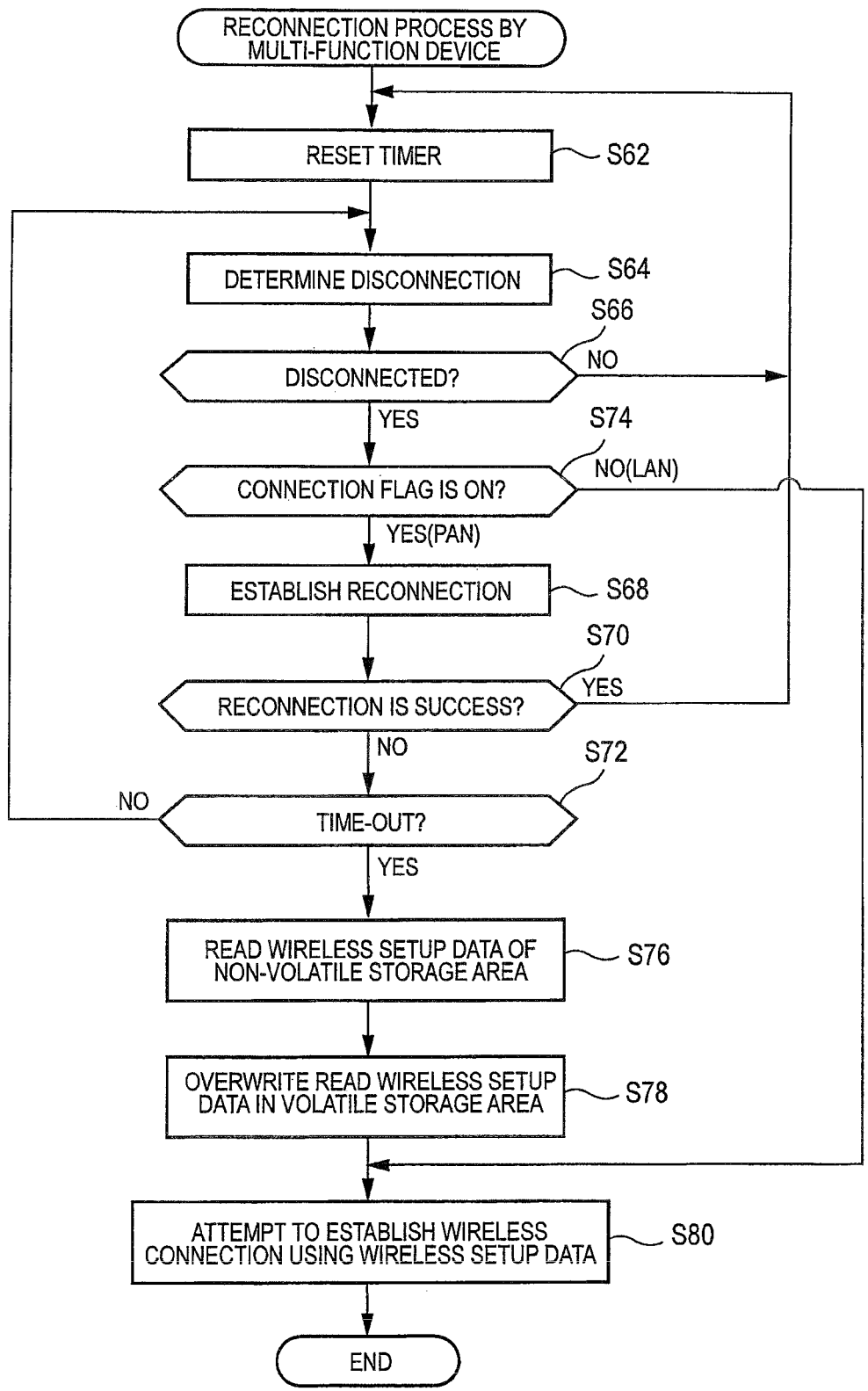
FIG. 6 shows a flowchart of a reconnection process to be executed by a multi-function device according to a third illustrative embodiment.

FIG. 6 is a flowchart showing the reconnection process of the multi-function device 10. The same process as that of the flowchart of FIG. 4 is denoted by the same reference numeral and therefore description thereof is omitted. The detection section 58 of the multi-function device 10 executes the process of S62 to S66. Subsequently, the communication section 54 of the multi-function device 10 determines whether the connection flag stored in the flag storage area 26 is ON (S74). That is, the communication section 54 determines which one of the LAN 100 and the PAN 140 the detected disconnected network is. If it is determined that the connection flag is ON (YES in S74), that is, when the detected disconnected network is the PAN 140, the communication section 54 executes the process of S68 to S72 and S76 to S80. On the other hand, if it is determined that the connection flag is OFF (NO in S74), that is, when the detected disconnected network is the LAN 100, the process proceeds to S80 while the communication section 54 does not execute the process of S68 to S72 and S76.

The multi-function device 10 according to the third illustrative embodiment can also have the same effect as the multi-function device 10 of the first illustrative embodiment.

As is apparent from the above description, the LAN 100 is an example of a first wireless network and the PAN 140 is an example of a second wireless network. The multi-function device 10 is an example of a wireless communication device, and the first PC 110 is an example of a terminal device. The probe response is an example of a specific signal. The flag control section 60 is an example of a value storage control section, the flag storage area 26 is an example of a predetermined storage area which stores a first value and a second value, the connection flag OFF is an example of the first value, and the connection flag ON is an example of the second value.

While the present invention has been shown and described with reference to certain illustrative embodiments thereof, it will be understood by those skilled in the art that various changes in form and details may be made therein without departing from the spirit and scope of the invention as defined by the appended claims. Examples of changes will be described as follows.

(1) In the above-described first illustrative embodiment, the communication section 54 attempts to establish the reconnection to the PAN when the detection section 58 of the multi-function device 10 detects the disconnection from the PAN 140 (S68 of FIG. 4). However, the communication section 54 may not attempt to establish the reconnection to the PAN 140 even though the detection section 58 detects the disconnection from the PAN 140. That is, the communication section 54 may execute the process of S74 without executing the process of S68 to S72 if it is determined the connection has been disconnected (YES in S66) in the flowchart of FIG. 4.

(2) The reconnection process to be executed by the multi-function device 10 according to the third illustrative embodiment described above is implemented by changing a processing procedure of the reconnection process (FIG. 4) to be executed by the multi-function device 10 of the first illustrative embodiment. Alternatively, the reconnection process to be executed by the multi-function device 10 of the third illustrative embodiment may be implemented by changing a processing procedure of the reconnection process (FIG. 5) to be executed by the multi-function device 10 of the second illustrative embodiment.

(3) In the above-described illustrative embodiments, the determination section 56 determines that the multi-function device 10 is to be connected to the PAN 140 when specific information indicating that My WiFi Technology is supported is included in a probe response, and determines that the multi-function device 10 is to be connected to the LAN 100 when this specific information is not included. Alternatively, the determination section 56 may determine that the multi-function device 10 is to be connected to the LAN 100 when specific information indicating the LAN 100 is included in the probe response, and may determine that the multi-function device 10 is to be connected to the PAN 140 when the specific information indicating the LAN 100 is not included.

(4) In the above-described illustrative embodiments, the WPS push button system is used for automatic wireless setup. Alternatively, a WPS PIN code system may be used.

(5) In the above-described illustrative embodiments, WPS is used as one of automatic wireless setup modes. Alternatively, for example, the automatic wireless setup mode may be AOSS (registered trademark) (AirStation One-Touch Secure System) or SES (registered trademark) (Secure Easy Setup).

(6) A technique of the above-described illustrative embodiments is applicable to other wireless communication devices such as a PC, a server, a printer, a scanner, a phone, and a facsimile as well as the multi-function device 10.

The technical elements described in this specification or the drawings exhibit technical utility when used alone or in various combinations, and are not limited to the combinations described in the claims as filed. The technique illustrated in this specification or the drawings can achieve a plurality of objects at the same time, and the technical utility can be provided by achieving one object thereof itself.

What is claimed is:

1. A wireless communication device which is connectable to a first wireless network including an access point and which is connectable to a second wireless network including a terminal device having an access point function, the wireless communication device comprising:
   a setting section configured to store wireless setup data in a volatile storage area, the wireless setup data being acquired according to an automatic wireless setup mode;
   a communication section configured to perform wireless communication using the wireless setup data stored in the volatile storage area; and
   a determination section configured to determine which one of the first wireless network and the second wireless network the wireless communication device is to be connected to, based on information which can be included in a specific signal received from the access point or the terminal device,
   wherein if the determination section determines that the wireless communication device is to be connected to the first wireless network, the setting section stores first wireless setup data acquired from the access point into the volatile storage area and a non-volatile storage area, and
   wherein if the determination section determines that the wireless communication device is to be connected to the second wireless network, the setting section stores second wireless setup data acquired from the terminal device into the volatile storage area without storing the second wireless setup data into the non-volatile storage area.

2. The wireless communication device according to claim 1,
   wherein the determination section determines that the wireless communication device is to be connected to the second wireless network if specific information indicating the second wireless network is included in the specific signal, the specific signal being received from the access point or the terminal device before acquiring the wireless setup data according to the automatic wireless setup mode, and
   wherein the determination section determines that the wireless communication device is to be connected to the first wireless network if the specific information is not included in the specific signal.

3. The wireless communication device according to claim 1, further comprising:
   a detection section configured to detect a disconnection from the first or second wireless network,
   wherein in a first case where the detection section detects a disconnection from the first wireless network, the communication section further performs a first attempt process of attempting to establish a reconnection to the first wireless network using the first wireless setup data stored in the volatile storage area, and
   wherein in a second case where the detection section detects a disconnection from the second wireless network, the communication section further performs a second attempt process of attempting to establish a connection to the first wireless network by storing the first wireless setup data, which is stored in the non-volatile storage area, into the volatile storage area, while deleting the second wireless setup data from the volatile storage area.

4. The wireless communication device according to claim 3, further comprising:
   a value storage control section configured to store a first value in a predetermined storage area if the determination section determines that the wireless communication device is to be connected to the first wireless network, and configured to store a second value in the predetermined storage area if the determination section determines that the wireless communication device is to be connected to the second wireless network,
   wherein the communication section performs the first attempt process in the first case where the first value is stored in the predetermined storage area when the detection section detects a disconnection from the first or second wireless network, and
   wherein the communication section performs the second attempt process in the second case where the second value is stored in the predetermined storage area when the detection section detects a disconnection from the first or second wireless network.

5. The wireless communication device according to claim 3,
   wherein in the second case, the communication section further performs a third attempt process of attempting to establish a reconnection to the second wireless network without deleting the second wireless setup data stored in the volatile storage area during a predetermined time period, and
   wherein the communication section performs the second attempt process when the reconnection is failed even if the third attempt process is performed during the predetermined time period.

6. The wireless communication device according to claim 3,
   wherein in the second case, the communication section further performs a third attempt process of attempting to establish a reconnection to the second wireless network without deleting the second wireless setup data, and
   wherein the communication section performs the second attempt process when the reconnection is failed even if the third attempt process is performed by a predetermined number of times.

7. A non-transitory computer storage medium having a computer program stored thereon and readable by a computer for a wireless communication device which is connectable to a first wireless network including an access point and which is connectable to a second wireless network including a terminal device having an access point function, the computer program, when executed by the computer, causing the computer to perform operations comprising:
   storing wireless setup data into a volatile storage area, the wireless setup data being acquired according to an automatic wireless setup mode;
   performing wireless communication using the wireless setup data stored in the volatile storage area; and
   determining which one of the first wireless network and the second wireless network the wireless communication device is to be connected to, based on information which can be included in a specific signal received from the access point or the terminal device, wherein the storing includes:
   if it is determined that the wireless communication device is to be connected to the first wireless network, storing first wireless setup data acquired from the access point into the volatile storage area and a non-volatile storage area; and if it is determined that the wireless communicate device is to be connected to the second wireless network, storing second wireless setup data acquired from the terminal device into the volatile storage area without storing the second wireless setup data into the non-volatile storage area.

8. A wireless communication device comprising:
- a communication interface configured to wirelessly communicate with either one of a local area network (LAN) including an access point and a personal area network (PAN) including a portable terminal device having an access point function;
- a storage section including a volatile storage area and a non-volatile storage area;
- a first acquiring section configured to acquire a response signal responsive to a probe request transmitted to an external device which is either one of the access point and the portable terminal device;
- a determination section configured to determine which one of the LAN and the PAN the communication interface is to be connected to, based on information which can be included in the response signal;
- a second acquiring section configured to acquire wireless setup data from the external device;
- a setting section configured to store the wireless setup data into the volatile storage area and the non-volatile storage area if the determination section determines that the communication interface is to be connected to the LAN, and configured to store the wireless setup data into the volatile storage area without storing the wireless setup data into the non-volatile storage area if the determination section determines that the communication interface is to be connected to the PAN; and
- a communication section configured to communicate with the external device via the communication interface using the wireless setup data stored in the volatile storage area.

9. The wireless communication device according to claim 8, further comprising:
- a detection section configured to detect a disconnection from the LAN or the PAN,
- wherein if the detection section detects a disconnection from the LAN, the communication section attempts to establish a reconnection with the LAN using the wireless setup data stored in the volatile storage area, and
- wherein if the detection section detects a disconnection from the PAN, the setting section overwrites the wireless setup data stored in the non-volatile storage area on the wireless setup data in the volatile storage area and the communication section attempts to establish a connection with the LAN using the wireless setup data overwritten in the volatile storage area.

* * * * *